(12) United States Patent
Yang

(10) Patent No.: US 8,035,636 B1
(45) Date of Patent: Oct. 11, 2011

(54) SOFTWARE SYSTEM FOR EFFICIENT DATA TRANSPORT ACROSS A DISTRIBUTED SYSTEM FOR INTERACTIVE VIEWING

(75) Inventor: Chien K. Yang, Fremont, CA (US)

(73) Assignee: Oracle America, Inc., Redwood City, CA (US)

( * ) Notice: Subject to any disclaimer, the term of this patent is extended or adjusted under 35 U.S.C. 154(b) by 927 days.

(21) Appl. No.: 11/221,496

(22) Filed: Sep. 8, 2005

(51) Int. Cl.
  *G06T 15/00* (2011.01)
(52) U.S. Cl. .......................... 345/419; 345/418; 345/473
(58) Field of Classification Search .................. None
  See application file for complete search history.

(56) References Cited

U.S. PATENT DOCUMENTS

| | | | | |
|---|---|---|---|---|
| 5,758,028 A * | 5/1998 | Kaan et al. | 706/46 |
| 5,953,506 A * | 9/1999 | Kalra et al. | 709/231 |
| 6,130,670 A * | 10/2000 | Porter | 345/421 |
| 6,222,551 B1 * | 4/2001 | Schneider et al. | 345/419 |
| 6,456,286 B1 * | 9/2002 | Arai et al. | 345/423 |
| 6,522,331 B1 * | 2/2003 | Danks | 345/473 |
| 6,525,732 B1 * | 2/2003 | Gadh et al. | 345/428 |
| 6,674,437 B1 * | 1/2004 | Rose et al. | 345/473 |
| 6,687,753 B2 * | 2/2004 | Schneider | 709/235 |
| 6,704,791 B1 * | 3/2004 | Harris | 709/231 |
| 6,915,328 B2 * | 7/2005 | Turnbull | 709/203 |
| 6,933,941 B1 * | 8/2005 | Peercy et al. | 345/428 |
| 6,995,765 B2 * | 2/2006 | Boudier | 345/428 |
| 7,042,455 B2 * | 5/2006 | Arcas | 345/428 |
| 7,212,217 B1 * | 5/2007 | Feather et al. | 345/630 |
| 7,428,744 B1 * | 9/2008 | Ritter et al. | 725/10 |
| 7,574,423 B2 * | 8/2009 | Dettinger et al. | 1/1 |
| 7,574,653 B2 * | 8/2009 | Croney et al. | 715/249 |
| 7,634,470 B2 * | 12/2009 | Rajasekaran et al. | 1/1 |
| 2002/0063704 A1 * | 5/2002 | Sowizral et al. | 345/419 |
| 2003/0065668 A1 * | 4/2003 | Sowizral et al. | 707/100 |
| 2005/0182844 A1 * | 8/2005 | Johnson et al. | 709/230 |
| 2006/0125836 A1 * | 6/2006 | Lojou | 345/581 |

OTHER PUBLICATIONS

Clayton et al., "3D Studio Max Applied," 1996, Advanstar Communications, pp. 248-250.*
John Shalf and E. Wes Bethel; "The Grid and Future Visualization System Architectures"; IEEE Computer Graphics and Applications; Mar./Apr. 2003; pp. 6-9; vol. 23, Issue 2.

* cited by examiner

*Primary Examiner* — Ulka Chauhan
*Assistant Examiner* — Andrew G Yang
(74) *Attorney, Agent, or Firm* — Meyertons, Hood, Kivlin, Kowert & Goetzel, P.C.; Mark K. Brightwell

(57) ABSTRACT

A server receives a graphics data request from a client system through a network. The request includes client description data describing capabilities of the client system. The server accesses the requested graphics data from an augmented scene graph. The server determines which one or more operations from a set of operations are to be performed on the graphics data based on the client description data. The set of operations includes:
  (a) compiling the graphics data; and
  (b) removing nodes from the compiled graphics data that are not visible to a user to obtain view-limited compiled graphics data.
  (c) culling the view-limited compiled graphics data with a view frustum to obtain state-sorted graphics data and
  (d) rendering the state-sorted graphics data to obtain images.
The server performs the one or more operations on the graphics data to obtain resultant graphics data, and, transmits the resultant graphics data to the client system.

19 Claims, 12 Drawing Sheets

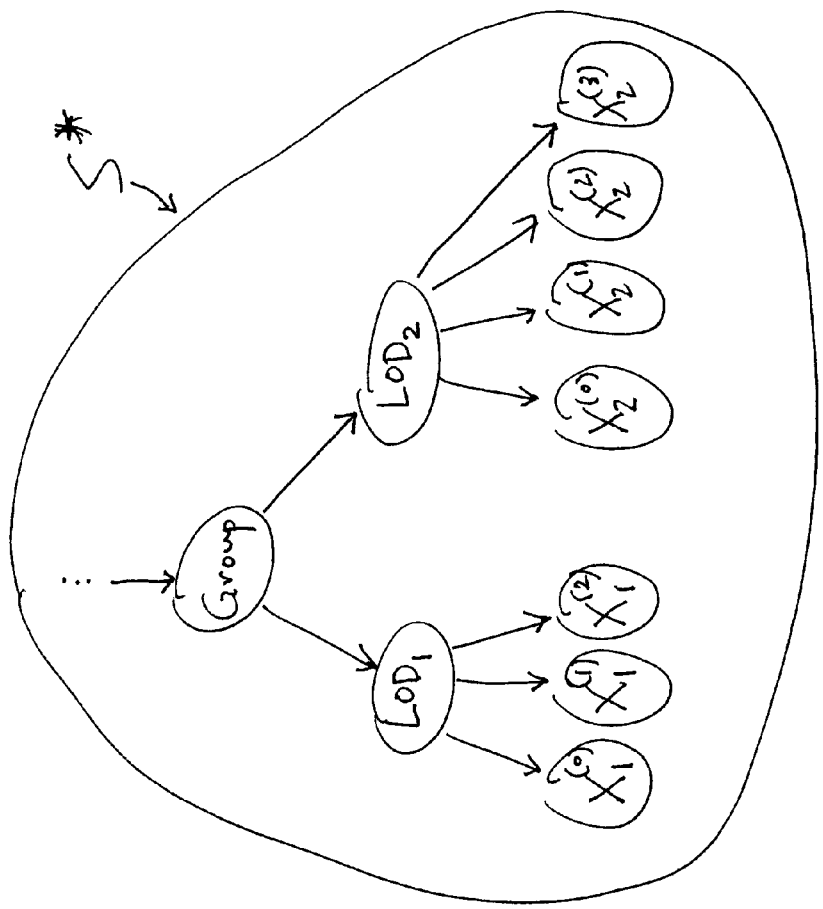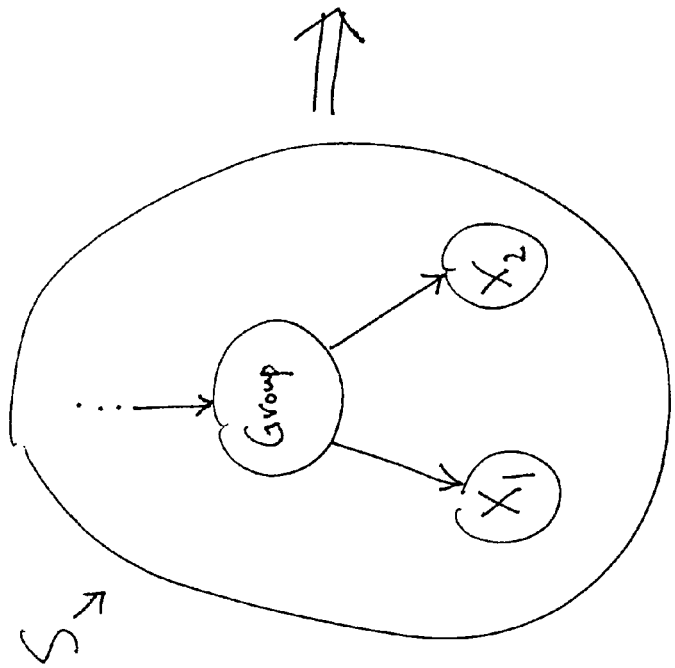
Fig. 5

SOFTWARE SYSTEM FOR EFFICIENT DATA TRANSPORT ACROSS A DISTRIBUTED SYSTEM FOR INTERACTIVE VIEWING

BACKGROUND OF THE INVENTION

1. Field of the Invention

This invention is related to the field computer graphics, and more particularly, to a system and method for communicating graphic data through a network.

2. Description of the Related Art

Computer networks permit the distribution of computational labor across a number of computers. One computer (a server) may be configured to provide computational services to other computers (clients). In particular, a server may be specially configured to store and maintain graphics data such as scene graphs for clients. A client may send requests for graphics data to the server. The server may receive the requests and send back the requested graphics data through the network. Since the graphics data (e.g., a portion of a scene graph) may be voluminous and complex, the client may need to be well endowed with resources such as a powerful host processor, a powerful graphics accelerator and high network access bandwidth in order to render and display the graphics data with a latency that is acceptable to the user. Unfortunately, many computer system are not so well endowed. There exists a need for a system and methodology of serving graphics data (especially scene graph data) to clients with a wide variety of processing and rendering capabilities.

SUMMARY

In one set of embodiments, a server may be configured to implement a method for communicating graphics data to clients through a network. The method may involve the following actions. The server may receive a request for graphics data from a client system through a network. The request may include client description data which describes capabilities of the client system. The server may access the requested graphics data from an augmented scene graph. The augmented scene graph may be stored in a system memory of the server.

The server may determine which one or more operations from a set of possible operations are to be performed on the graphics data based on the client description data. The set of possible operations may include:
 (a) compiling the graphics data; and
 (b) removing nodes from the compiled graphics data that are not visible to a user to obtain view-limited compiled graphics data.

The server may perform the one or more operations on the graphics data to obtain resultant graphics data, and, transmit the resultant graphics data to the client system through the network.

In some embodiments, the set of possible operations may further include: (c) culling the view-limited compiled graphics data with a view frustum to obtain state-sorted graphics data. In one embodiment, the set of possible operations may yet further include: (d) rendering the state-sorted graphics data to obtain rendered images.

The server may generate the augmented scene graph by expanding a preexisting scene graph S. The process of expanding the scene graph S may include:
 expanding one or more Shape3D nodes in the scene graph S; and
 expanding one or more texture objects in the scene graph S.

In one set of embodiments, the processes of receiving, accessing, determining, performing and transmitting are implemented as part of a graphics application programming interface (API), e.g., as part of a scene-graph-based graphics API such as Java3D™.

The client description data may describe capabilities of the client system, e.g., capabilities including:
 physical constraints of the client system; and
 a network connection bandwidth of the client system.

In addition, the client description data may describe client system capabilities such as:
 preferences of a user of the client system regarding performance of a software application; and
 view information.

The view information may include a direction of gaze and/or a virtual viewer position.

In one embodiment, the process of accessing the requested graphics data from the scene graph may include generating a copy of a subgraph of the scene graph specified by the request. The server may remove portions of data from said copy until:
 a maximum triangle count of the copy is less than or equal to a triangle count of the client system;
 a maximum texture size of the copy is less than or equal a texture memory capacity of the client system; and
 a maximum memory footprint of the copy is less than or equal to an amount of system memory in the client system available for storage of said request graphics data;
 wherein the triangle count, the texture memory capacity and the system memory amount of the client system are determined by the client description data.

Alternatively, if the client system does not have graphics rendering support, the server may remove portions of data from said copy until:
 a maximum triangle count of the copy less than or equal to a maximum triangle count of a server; a maximum texture size of the copy is less than or equal to a texture memory capacity of the server; and
 a maximum memory footprint of the copy is less than or equal to an available memory amount of the server.

In some embodiments, the resultant graphics data may include level-of-detail nodes. The process of transmitting the resultant graphics data may include transmitting Shape3D nodes under each level of detail node in order of lowest resolution to highest resolution. Thus, the client system may immediately begin to display images corresponding to the lower resolution Shape3D, and then, successively refine.

Furthermore, the resultant graphics data may include texture hierarchies. Thus, the process of transmitting the resultant graphics data may also include transmitting layers in each texture hierarchy in order from lowest resolution to highest resolution.

The client system may render the resultant graphics to obtain images (unless the resultant graphics data already are images). The client system may display the images on a display device of the client system.

The one or more operations (performed on the graphics data) may include a larger number of operations if the client description data indicates a user preference for speed than if the client description data indicates a user preference for image quality. The larger number of operations may serve to reduce the size of the data to facilitate faster transmission through the network and/or faster processing and rendering at the client.

In another set of embodiments, a server may implement a method for communicating graphics data to a plurality of clients through a network as follows. The server may receive a request for graphics data from a client system through the network. The request may include client description data. The client description data may contain values characterizing processing and graphics rendering capacities of the client system.

The server may access the requested graphics data from an augmented scene graph in response to the request.

The server may determine which one or more operations from a set of possible operations are to be performed on the graphics data based on the client description data. The set of possible operations may include:
- compiling the graphics data;
- removing nodes from the compiled graphics data that are not visible to a user to obtain view-limited compiled graphics data.

The server may perform the one or more operations on the graphics data to obtain resultant graphics data, and, transmit the resultant graphics data through the network to the client system.

In some embodiments, the set of possible operations may further include culling the view-limited compiled graphics data with a view frustum to obtain state-sorted graphics data. The set of possible operations may yet further include rendering the state-sorted graphics data to obtain rendered images.

In one embodiment, the server may repeat the above described processes (of receiving, accessing, determining, performing and said transmitting) for each of a plurality of requests asserted by a plurality of client systems.

It is noted that any or all of the method embodiments described herein may be implemented in terms of program instructions and the program instructions may be stored on any of a wide variety of computer-readable memory media. Examples of memory media include:
- semiconductor memories of various kinds (including semiconductor RAM and semiconductor ROM of various kinds),
- magnetic memories of various kinds (including magnetic disks of various kinds), and
- optical storage media of various kinds (including CD-ROM and DVD).

It is further noted that program instructions implementing any or all of the methods described herein may be transmitted through any of various transmission media or combinations thereof, and thereby, made available to server systems and client systems. Examples of transmission media include:
- optical media such as optical fiber;
- wired electrical links; and
- free space.

As used herein, the term "transmission medium" includes computer networks such as local area networks or wide area networks. For example, program instructions implementing one or more of the embodiments described herein may be distributed to servers and/or clients through a computer network such as Internet.

It is further noted that program instructions implementing any or all of the method embodiments described herein may be stored in the memory of a computer system. A processor (of set of processors) of the computer system may be configured to read and execute the program instructions of the memory in order to enact the method embodiment(s).

BRIEF DESCRIPTION OF THE FIGURES

The following detailed description makes reference to the accompanying drawings, which are now briefly described.

FIG. 5 illustrates one embodiment of the process of expanding geometry containing nodes (such as Shape3D nodes) in a scene graph.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). The phrase "A includes B" is to be interpreted as "A includes B, but is not limited to B".

DETAILED DESCRIPTION OF EMBODIMENTS

Figure 1:
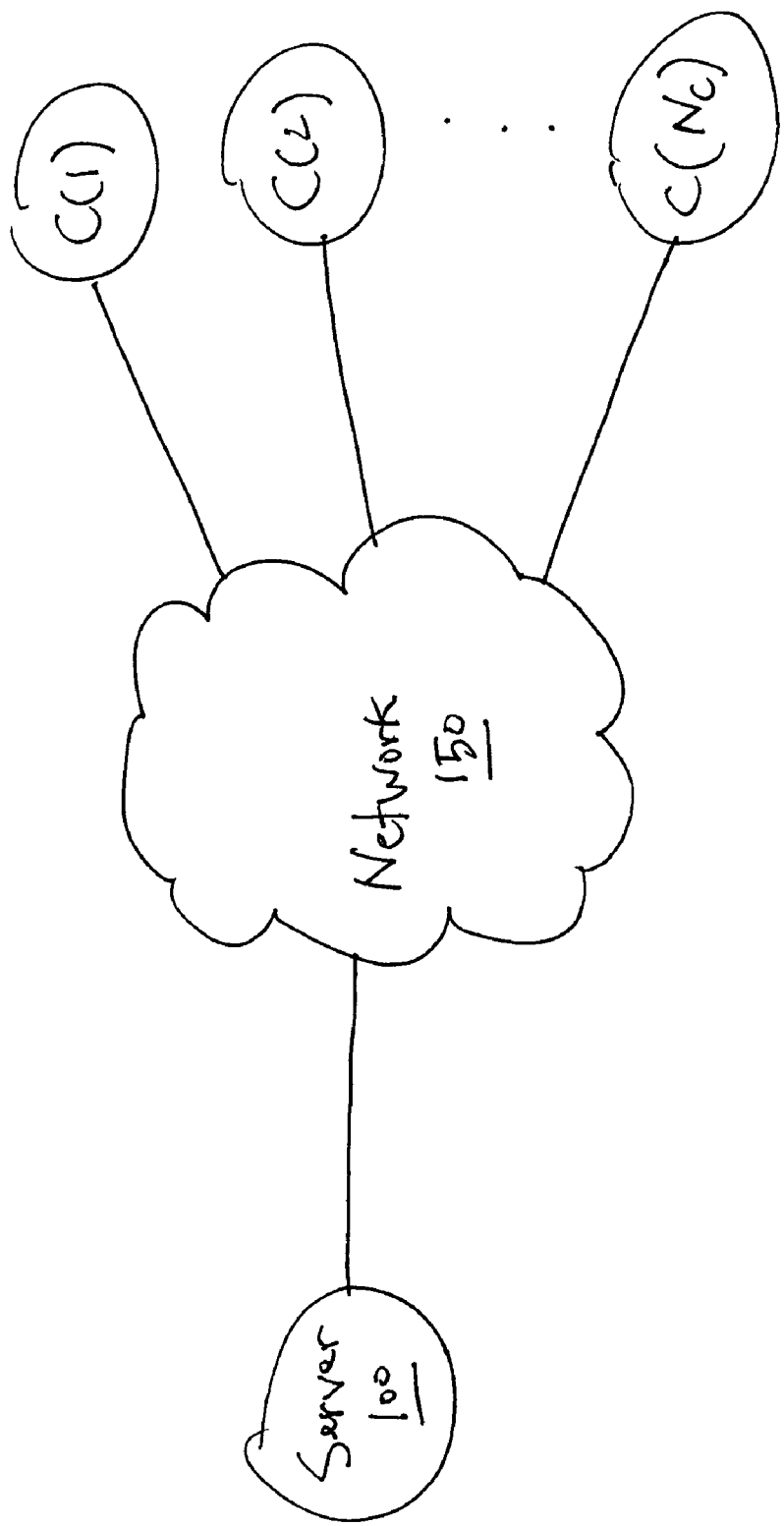
FIG. 1 illustrates a server connected to a number of client systems through a computer network according to one embodiment.

A server 100 and a number of clients $C(1), C(2), \ldots, C(N_C)$ are configured for communicating through a computer network 150 as illustrated in FIG. 1, where $N_C$ is a positive integer. The number $N_C$ may take any value subject to the limitations imposed by fundamental constraints such as server processing bandwidth, server memory capacity, network bandwidth, etc.

Figure 2:
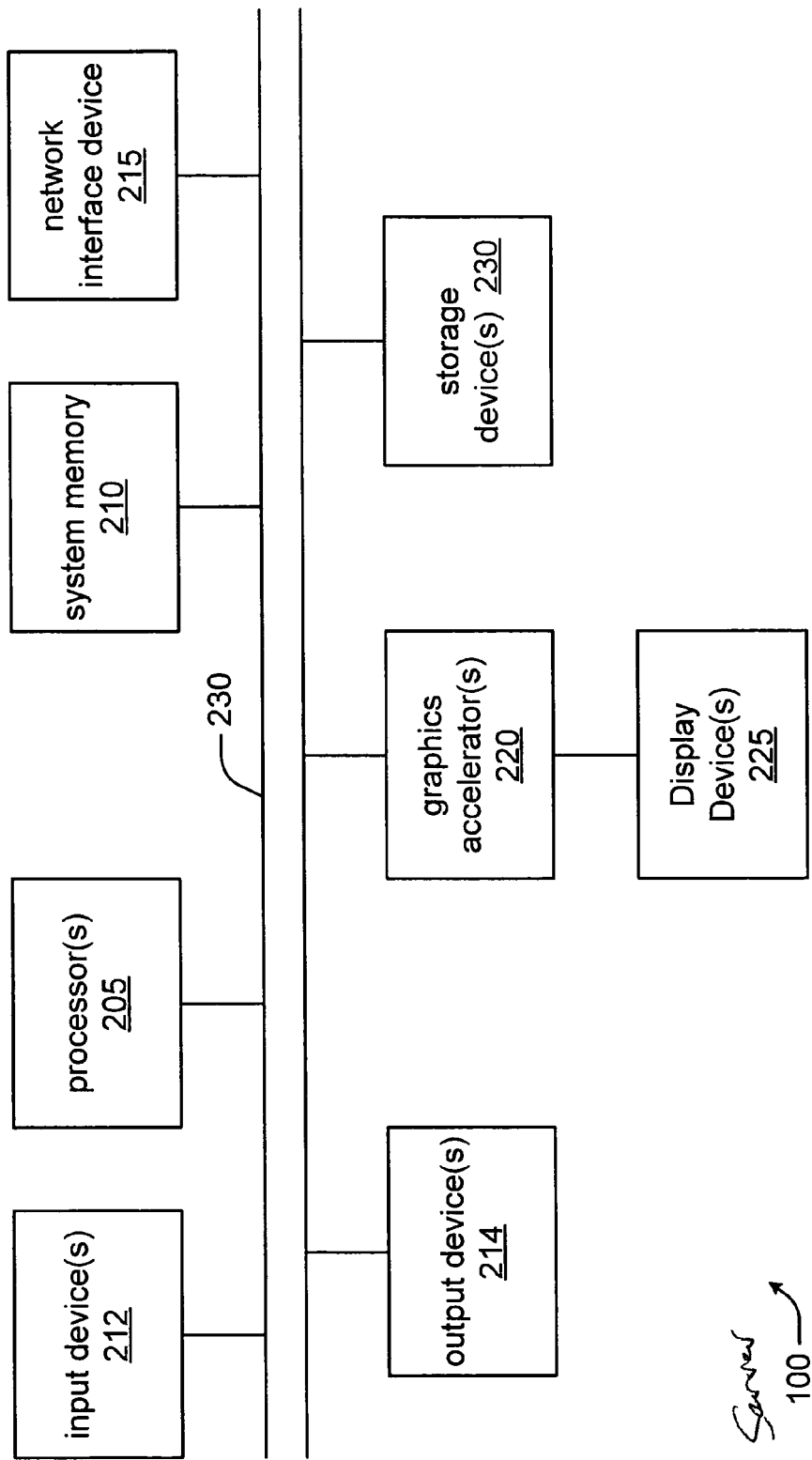
FIG. 2 illustrates one embodiment of the server computer system.

The server 100 may include one or more processors 205 and memory 210 as shown in FIG. 2. The memory 210 may be configured to store program instructions and data. The one or more processors 205 may be configured to read and execute the program instructions from the memory 210. The memory may include any of various kinds of random access memory (RAM) and read-only memory (ROM).

The server 100 may also include:
  a network interface device 215 (e.g., an Ethernet card);
  one or more graphics accelerators 220; and
  one or more storage devices 230.

The network interface device 215 is configured for coupling to the computer network 150 and allows the server 100 to communicate with other devices through the computer network. The storage devices 230 may include devices such as hard disks, compact disk (CD) drives, digital versatile disk (DVD) drives, floppy drives, magnetic tape drives, etc.

In some embodiments, the server 100 may also include:
  one or more input devices 212 such as a keyboard and mouse;
  one or more display devices 225; and
  one or more output devices 214 (e.g., speakers).

The server 100 may be configured according to any of various known computer system architectures.

Each client C(k), k=1, 2, . . . , $N_C$, may configured as follows.

Figure 3:
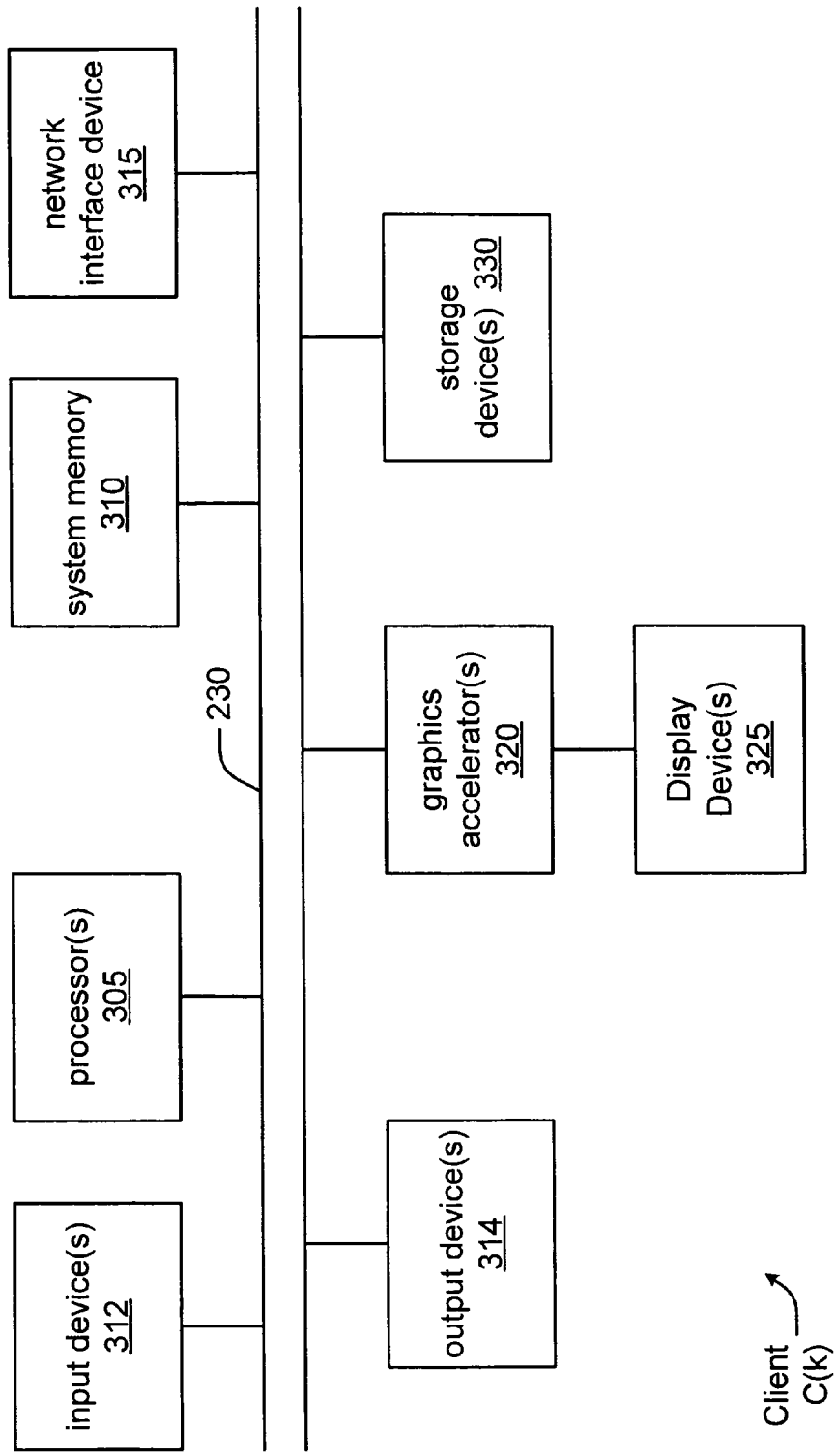
FIG. 3 illustrates one embodiment of a client computer system.

The client C(k) may include one or more processors 305 and memory 310 as shown in FIG. 3. The memory 310 may be configured to store program instructions and data. The one or more processors may be configured to read and execute the program instructions from the memory 310. The memory 310 may include any of various kinds of random access memory (RAM) and read-only memory (ROM).

The client C(k) may also include a network interface device 315 (e.g., an Ethernet card). The network interface device 315 is configured for coupling to the computer network 150 and allows the client to communicate with other devices through the computer network.

The client C(k) may also include one or more storage devices 330 (such as hard disks, CD-ROM drives, floppy drives, magnetic tape drives).

The client C(k) may also include:
  one or more input devices 312 such as a keyboard, a mouse, a 6DOF input device;
  one or more display devices 325; and
  one or more output devices 314 (e.g., speakers).

The client C(k) may be configured according to any of various known computer system architectures.

The client C(k) may also include a graphics accelerator 320 (or a set of graphics accelerators) configured to accelerate graphics computations, especially 3D graphics computations. The graphics accelerator 320 may be configured to receive graphics data and to perform rendering computations on the graphics data in order to generate a video output stream. The video output stream may be used to drive the display device(s) 325. The display device(s) 325 may include devices such as monitors, projectors or head-mounted displays.

It is noted that graphics accelerators may be evaluated based on certain performance features such as texture memory capacity and triangle rate capacity.

The server 100 and the clients C(1), C(2), . . . , C($N_C$) are configured to execute software applications. Some of the software applications may be configured for client-server based operation. Thus, an application may include a server component configured to execute on the server 100, and, a client component configured to execute on a client. The client component interacts with the server component to accomplish desired processing operations. Furthermore, the server component may be configured to interact with client components executing on a number of different clients.

The server component of an application may be referred to simply as "the server application". Similarly, the client component of the application may be referred to simply as "the client application".

In addition, the server 100 and the clients may each be configured with a software infrastructure that performs a host of basic functions. For example, each software infrastructure may include a network operating system, a scene-graph-based graphics API (i.e., a graphics API that is configured to operate using scene graphs), and perhaps one or more other graphics APIs such as OpenGL® and DirectX®. API is an acronym for "application programming interface". Java3D™ is an example a scene-graph-based graphics API.

The client applications and the server application may rely on the software infrastructures to communicate with one another.

As noted above, part of the software infrastructure at the server 100 and at each client C(k) may be a scene-graph-based graphics API. The scene-graph-based graphics API executing on the server 100 may be referred to herein as "the server interface". The scene-graph-based API executing on a client application may be referred to herein as "the client interface". In one set of embodiments, the scene-graph-based graphics API may be implemented as an extension to existing Java3D™.

Figure 4:
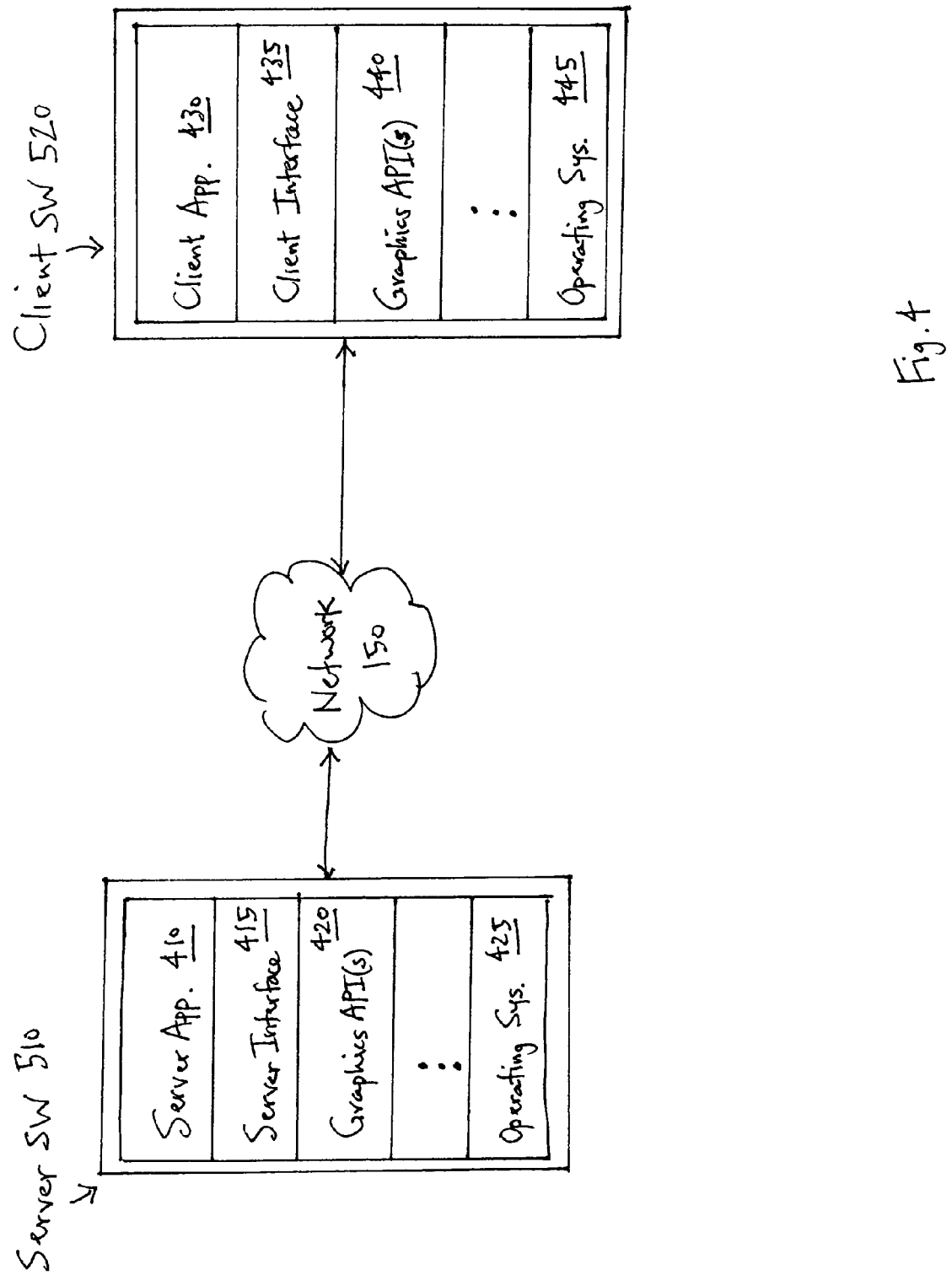
FIG. 4 illustrates one embodiment for the server software and the client software.

FIG. 4 illustrates one embodiment of a server software system 510 and a client software system 520. The server software system 510 may include:
  a server application 410 (e.g., the server portion of a graphics application),
  a server interface 415,
  one or more graphics APIs 420, and
  an operating system 425.

In one embodiment, the server interface 415 is implemented as an extension to Java3D™.

The client software system 520 may include:
  a client application (e.g., the client portion of a graphics application),
  a client interface 435,
  one or graphics APIs 440 (preferably compatible with the one or more graphics APIs 420), and
  an operating system 445 (preferably compatible with the operating system 425).

In one embodiment, the client interface 435 may be implemented as an extension to Java3D™.

The server software system 510 is configured to communicate with the client software system 520 through the network 150. The operating systems 425 and 445 may be specially configured to facilitate this communication.

The server application 410 may create a scene graph S. The scene graph S may be stored in server memory 210.

A scene graph contains a description of a scene including geometric data and attribute information (such as texture and material properties). Scene graphs and their use in rendering 3D virtual worlds are well known to graphics programmers and especially to users of Java3D™.

The server interface 415 may expand the scene graph S (e.g., during an initialization phase) into an augmented scene graph S*. In particular, the server interface 415 may generate the augmented scene graph S* by expanding:
  (a) Shape3D nodes in the scene graph S, and
  (b) texture objects in the scene graph S.

The server interface 415 may expand a Shape3D node X in the scene graph by:
  (1) inserting a level-of-detail (LOD) node between node X and its parent;

(2) creating one or more lower resolution Shape3D nodes (known as imposters) from the node X by applying a lossy geometric compression algorithm one or more times to the geometry of the Shape3D node X; and (3) attaching the one or more newly created Shape3D nodes to the LOD node.

Thus, the geometric object (or objects) corresponding to the Shape3D node X will be represented at two or more different resolutions. (Resolution may be measured in terms of number of vertices or number of triangles.)

FIG. 5 illustrates a portion of the scene graph S and the corresponding portion of the augmented scene graph S* according to one embodiment. On the left, the scene graph portion includes a group node and two Shape3D nodes $X_1$ and $X_2$ as children of the group node. On the right, the augmented scene graph portion includes the group node now pointing to two level-of-detail (LOD) nodes $LOD_1$ and $LOD_2$ corresponding to $X_1$ and $X_2$ respectively. Each LOD node points to a number of Shape3D children at varying resolutions. $X_1^{(0)}$ is a copy of $X_1$. Nodes $X_1^{(1)}$ and $X_1^{(2)}$ are successively lower resolution versions of $X_1$. Similarly, $X_2^{(0)}$ is a copy of $X_2$. Nodes $X_2^{(1)}$, $X_2^{(2)}$ and $X_2^{(3)}$ are successively lower resolution versions of $X_2$.

The lossy geometric compression algorithm may be realized by any various known algorithms. For example, the techniques described in one or more of the following articles may be used to implement the lossy geometric compression:

Michael Deering, "Geometry Compression", Computer Graphics Proceedings (SIGGRAPH 1995), pp. 13-20, 1995; and Andrei Khodakovsky, Peter Schröder & Wim Sweldens, "Progressive Geometry Compression", Computer Graphics Proceedings (SIGGRAPH 2000), pp. 271-278, 2000.

In some embodiments, an LOD node may itself perform steps (2) and (3). In Java3D™, nodes may include program code.

There is no requirement that all Shape3D nodes in the scene graph S be expanded. In one set of embodiments, the server application 410 (or client application 430) may specify which Shape3D nodes in the scene graph S are to be expanded. For example, each Shape3D node in the scene graph S may include an expansion control bit. The server application 410 may set the expansion control bit of a Shape3D node equal to one if the Shape3D node is to be expanded, and to zero if not. The server interface 415 may check the expansion control bit of each Shape3D node to determine if the node should be expanded.

The server interface 415 may expand a texture object Y into a hierarchy of texture information (e.g., a mipmap) by applying a lossy texture compression algorithm to the texture object Y one or more times. The hierarchy may include the texture object Y as its highest resolution level. The hierarchy also includes one or more levels at lower resolutions. Thus, the original texture object Y will be represented at two or more different resolutions.

There is no requirement that all texture object nodes in the scene graph S be expanded. In one set of embodiments, the server application 410 (or client application 430) may specify which texture objects in the scene graph S are to be expanded. For example, each texture object in the scene graph S may include an expansion control bit. The server application 410 may set the expansion control bit of a texture object equal to one if the texture object is to be expanded, and to zero if not. The server interface 415 may check the expansion control bit of each texture object to determine if it should be expanded.

The nodes of a scene graph may be classified as leaf nodes or group nodes. Group nodes can have zero or more children. Leaf nodes have no children.

For each group node G in the augmented scene graph S*, let $S_G$ denote the subgraph of S* whose root is the group node G. In other words, the subgraph $S_G$ includes the group node G and everything under the group node G.

Let $MAX_G$ denote the subgraph that would be obtained from subgraph $S_G$ by removing from each LOD node of the subgraph $S_G$ all but the highest resolution Shape3D node and by removing from each texture hierarchy of the subgraph $S_G$ all but the highest resolution level.

Let $MIN_G$ denote the subgraph that would be obtained from subgraph $S_G$ by removing from each LOD node of the subgraph $S_G$ all but the lowest resolution Shape3D node and by removing from each texture hierarchy of the subgraph $S_G$ all but the lowest resolution level.

The server interface 415 may traverse the augmented scene graph S* (e.g., during an initialization phase) in order to perform the following computations. For each group node G in the augmented scene graph S*, the server interface 415 may compute:

a maximum vertex count,
a minimum vertex count,
a maximum texture size,
a minimum texture size,
a maximum memory footprint, and
a minimum memory footprint for the subgraph $S_G$ under the group node G.

The maximum vertex count is defined as the sum of (a) the number of vertices in each unexpanded Shape3D node of the subgraph $S_G$ and (b) the number of vertices in the Shape3D node of maximum resolution underneath each LOD node in the subgraph $S_G$. In other words, the maximum vertex count corresponds to the number of vertices in the subgraph $MAX_G$.

The minimum vertex count is defined as the sum of (a) the number of vertices in each unexpanded Shape3D node of the subgraph $S_G$ and (b) the number of vertices in the Shape3D node of minimum resolution underneath each LOD node in the subgraph $S_G$. In other words, the minimum vertex count corresponds to the number of vertices in the subgraph $MIN_G$.

The maximum texture size is defined as the sum of (a) the size of each unexpanded texture object of the subgraph $S_G$ and (b) the size of the texture object of maximum resolution from each texture hierarchy in the subgraph $S_G$. In other words, the maximum texture size corresponds to a sum of the sizes of texture objects in the subgraph $MAX_G$.

The minimum texture size is defined as the sum of (a) the size of each unexpanded texture object of the subgraph $S_G$ and (b) the size of the texture object of minimum resolution from each texture hierarchy in the subgraph $S_G$. In other words, the minimum texture size corresponds to a sum of the sizes of texture objects in the subgraph $MIN_G$.

The maximum memory footprint is defined as the size of the subgraph $MAX_G$, i.e., the number of bytes (or words) required to store the subgraph $MAX_G$ in memory.

The minimum memory footprint is defined as the size of the subgraph $MIN_G$, i.e., the number bytes (or words) required to store the subgraph $MIN_G$ in memory.

Of course, the server interface 415 does not need to extract $MIN_G$ and $MAX_G$ from subgraph $S_G$ in order to compute the above maximum and minimum values. Instead, the server interface 415 may compute all the maximum and minimum values by accumulating the respective sums in a single traversal of the subgraph $S_G$. For example, in one embodiment, when the traversal encounters an LOD node, only the child Shape3D node of maximum resolution contributes to the maximum vertex count, and only the child Shape3D node of minimum resolution contributes to the minimum vertex count. Similarly, in that same embodiment, when the traversal encounters a texture hierarchy, only the highest resolution level contributes to the maximum texture size, and only the lowest resolution level contributes to the minimum texture size.

Figure 6:
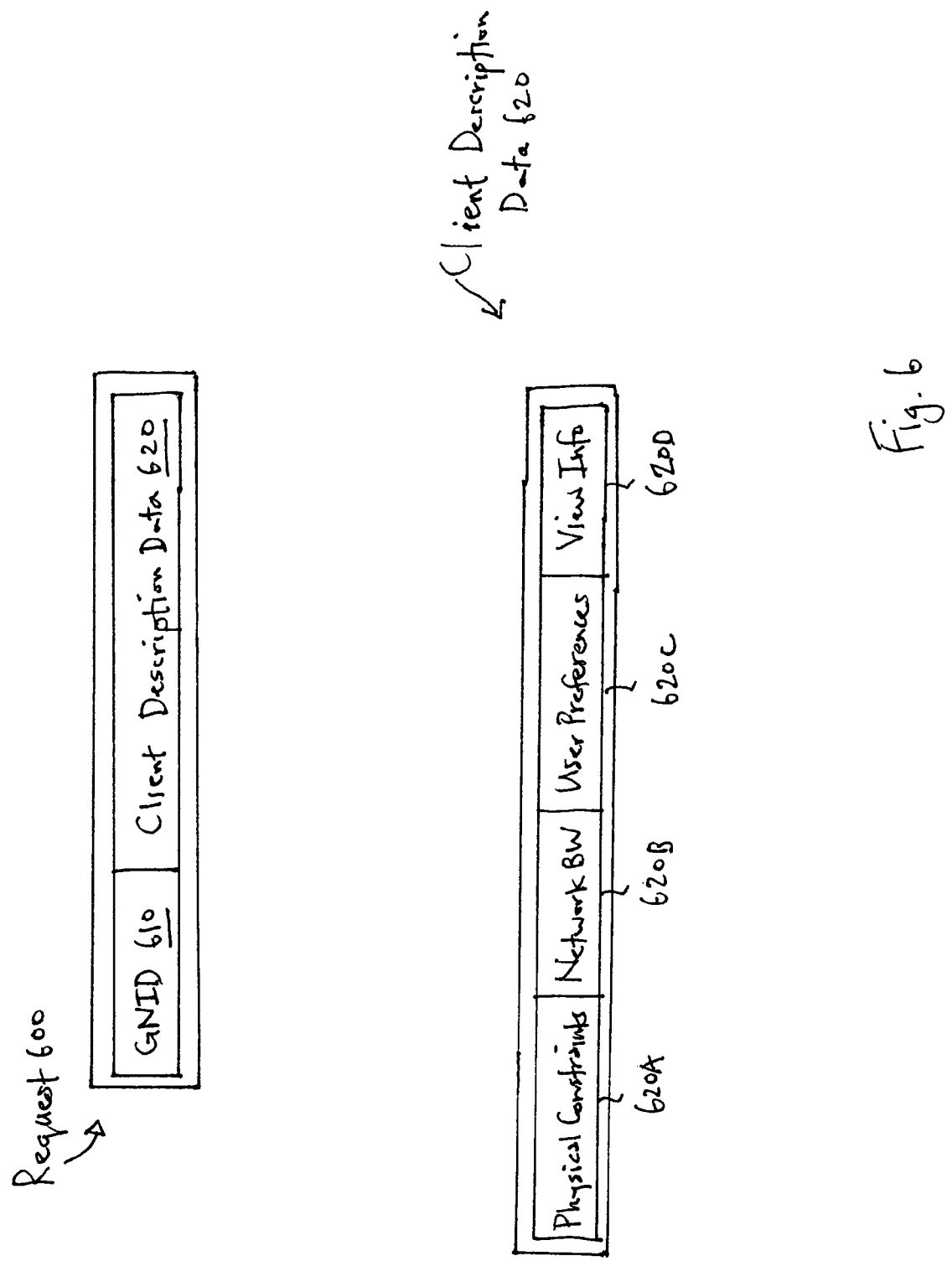
FIG. 6 illustrates one embodiment of a graphics data request 600 and one embodiment for client description data 620.

During an execution phase, the client interface 435, executing on one of the client systems $C(1), C(2), \ldots, C(N_C)$, may send a request for graphics data to the server interface 415 in response to a client request. As illustrated in FIG. 6, the request 600 for graphics data may include client description data 620.

The client description data 620 may include data specifying:
  physical constraints 620A of the client system;
  the network connection bandwidth 620B of the client system;
  user preferences 620C regarding how the application is to perform; and
  view information 620D (e.g., a direction of gaze and virtual position of the user).

In one embodiment, the request 600 for graphics data may be a request for graphics data corresponding to a specified group node G. Thus, the request 600 may include a group node identifier 610.

In some embodiments, the requests from different types of clients may have different forms.

The physical constraints 620A of the client system may include:
  the amount $M_H$ of system memory that is available (or that has been allocated) to store the requested graphics data;
  a value indicating the computational power of the client system, e.g., the computation power of the processor(s) 305;
  a value indicating the type of graphics rendering support provided by the client system, where the types of graphics rendering support may include "no support", "software support only", "graphics accelerator available";
  graphics rendering limits such as maximum triangle rate and texture memory capacity (provided the client system has software or hardware graphics rendering support); and
  characteristics of the client's display device (e.g., characteristics such as physical form factor, display frame rate, and display resolution).

The physical constraints 620A may be collected when the client interface 435 is installed on the client system and/or during an initialization phase of the client interface 435.

The client interface 435 may estimate the network connection bandwidth 620B whenever a network connection has established.

The client C(k) may support a graphical user interface through which a user of the client system may specify the user preferences. The user preferences may include:
  a selection of one of rendering speed (i.e., minimum latency rendering) or image quality, and
  a selection of desired rendering type such as wireframe rendering, flat shading, Gouraud shading, or programmable pixel and vertex shading.

In response to receiving the graphics data request 600 corresponding to group node G from a client C, the server interface 415 may copy the subgraph $S_G$ of the augmented scene graph S* and remove data from the copy X (if necessary) to create a subgraph $T_G(C)$ that can be processed and rendered sufficiently fast to satisfy the client's demands as expressed by the client description data 620. The processing and rendering of the subgraph $T_G(C)$ may be performed on the client and/or on the server 100 depending on the computational power of the client system and the type of graphics rendering support available at the client system.

The server interface 415 may store the subgraph $T_C(G)$ as a reference graph for serving other clients having similar constraints.

If the client system C has (software or hardware) graphics rendering support, the server interface 415 may remove data from the copy X in order to achieve the conditions that:
  (A1) the maximum triangle count of the copy X is less than or equal to the client's triangle count limit (which is defined as the client's maximum triangle rate divided by the client's display frame rate);
  (B1) the maximum texture size of the copy X is less than or equal to the client's texture memory capacity; and
  (C1) the maximum memory footprint of the copy X is less than or equal to the client's memory amount $M_H$.

If the client system C does not have any graphics rendering support, the server interface 415 may remove data from the copy X in order to achieve the conditions that:
  (A2) the maximum triangle count of the copy X is less than or equal to the maximum triangle rate of the server's graphics accelerator (or software renderer) divided by the client's display frame rate;
  (B2) the maximum texture size of the copy X is less than or equal to the server's texture memory capacity; and
  (C2) the maximum memory footprint of the copy X is less than or equal to the amount of server memory available per client.

The server interface 415 may traverse the copy X one or more times to remove data until the conditions (Ak), (Bk) and (Ck) are satisfied, where k=1 if the client system has graphics rendering support, and k=2 otherwise.

The server interface 415 may traverse the copy X in any of various orders (e.g., in a depth-first order, a breadth-first order, etc.). In some embodiments, the order of node traversal may be specified by the server application 410.

In one set of embodiments, the server interface 415 may traverse the copy X, and during this traversal:
  remove the highest resolution Shape 3D node underneath each LOD node having at least two Shape3D nodes as children; and
  remove the highest resolution level from each texture hierarchy having at least two levels.

The server interface 415 may update the maximum values (of triangle count, texture size and memory footprint) for the copy X after each removal of data. The traversal may be stopped early if and when the conditions (Ak), (Bk) and (Ck) are satisfied. If the conditions (Ak), (Bk) and (Ck) are not satisfied after having completed the first traversal, a second traversal may be performed to
  remove the highest resolution Shape 3D node underneath each LOD node having at least two remaining Shape3D nodes as children, and
  remove the highest resolution level from each texture hierarchy having at least two remaining levels.

The second traversal may be stopped early if and when the conditions (Ak), (Bk) and (Ck) are satisfied. If the conditions (Ak), (Bk) and (Ck) are not satisfied after having completed the second traversal, a third traversal may be performed, and so forth, until the conditions (Ak), (Bk) and (Ck) are satisfied.

The state of the copy X when the data removal process described above has completed is taken to be the subgraph $T_G(C)$.

In one alternative set of embodiments, the server interface 415 may traverse the copy X only once. Upon encountering in this traversal an LOD node having at least two Shape3D nodes as children, the server interface 415 may:
- (S1) remove the Shape3D node of highest resolution underneath the LOD node;
- (S2) update the maximum values of triangle count and memory footprint for the copy X to reflect the removal in (S1);
- (S3) determine if the maximum values of triangle count and memory footprint now satisfy (Ak) and (Ck);
- (S4) determine if more than one Shape3D node remains underneath the LOD node;
- (S5) repeat (S1) through (S4) until the maximum values of triangle count and memory footprint satisfy (Ak) and (Ck), or, until only one Shape3D node remains underneath the LOD node.

Furthermore, upon encountering a texture hierarchy having at least two levels, the server interface 415 may:
- (T1) remove the highest resolution level from the texture hierarchy;
- (T2) update the maximum values of texture size and memory footprint for the copy X to reflect the removal in (T1);
- (T3) determine if the maximum values of texture size and memory footprint now satisfy (Bk) and (Ck);
- (T4) determine if more than one texture level remains in the texture hierarchy;
- (T5) repeat (T1) through (T4) until the maximum values of texture size and memory footprint satisfy (Bk) and (Ck), or, until only one level remains in the texture hierarchy.

The traversal of the copy X may be terminated early if at any time the conditions (Ak), (Bk) and (Ck) are satisfied. The state of the copy X when this data removal process has completed is taken to be the subgraph $T_G(C)$.

After having created the subgraph $T_G(C)$, the server interface 415 may send the subgraph $T_G(C)$ to the client interface 435 through the network 150 if:
- the client system has a sufficiently large computational power to process the subgraph $T_G(C)$,
- the client's network connection bandwidth is sufficiently large to deliver the subgraph $T_G(C)$ in a timely fashion, and
- the client system has graphics rendering support.

The client system may receive the subgraph $T_G(C)$ and render the subgraph in order to generate images. The images may be used to drive display device(s) 325.

In one embodiment, the client system C may be declared to have a sufficiently large computational power to process the subgraph $T_G(C)$ if the computational power is large enough to process the subgraph $T_G(C)$ within the client frame period (i.e., the reciprocal of the client's display frame rate) or some predefined scalar multiple of the client frame period. Furthermore, the client's network connection bandwidth may be declared to be sufficiently large to deliver the subgraph $T_G(C)$ in a timely fashion if the client's network bandwidth is large enough to deliver the subgraph $T_G(C)$ to the client within a maximum acceptable wait time $T_W$.

3D Shape nodes under a given LOD node of the subgraph $T_G(C)$ may be sent to the client C in the order from lowest resolution to highest resolution. Similarly, the texture layers within a given texture hierarchy of the subgraph $T_G(C)$ may be sent to the client in the order from lowest resolution to highest resolution. This ordering strategy enables the client to quickly start displaying low resolution objects, and then, to successively refine the scene with higher resolution objects as time progresses.

If the client system C does not have a sufficiently large computational power to process the subgraph $T_G(C)$ or the client's network connection bandwidth is not sufficiently large to the deliver the subgraph $T_G(C)$ in a timely fashion, the server interface 415 may compile the subgraph $T_G(C)$ to obtain a compiled subgraph. The compiled subgraph takes up less memory than the subgraph $T_G(C)$ and takes less time to process than would the subgraph $T_G(C)$. After having generated the compiled subgraph, the server interface 415 may send the compiled subgraph to the client through the network 150 if:
- the computational power of the client system C is sufficiently large to handle the compiled subgraph,
- the client's network connection bandwidth is sufficiently large to deliver the compiled subgraph in a timely fashion, and
- the client system has graphics rendering support.

The client may receive the compiled subgraph and render the compiled subgraph in order to generate images. The images may be used to drive display device(s) 325.

If the client system C does not have a sufficiently large computational power to handle the compiled subgraph or the client's network connection bandwidth is not sufficiently large to deliver the compiled subgraph in a timely fashion, the server interface 415 may operate on the compiled subgraph to remove nodes that are not visible to the user based on the client's view information 620D (e.g., the direction of gaze and virtual position of the user), thereby obtaining a view-limited compiled subgraph. The view-limited compiled subgraph takes up less memory than the compiled subgraph and takes less time to process than would the compiled subgraph. After having generated the view-limited compiled subgraph, the server interface 415 may send the view-limited compiled subgraph to the client C through the network if:
- the computational power of the client system is sufficiently large to handle the view-limited compiled subgraph,
- the client's network connection bandwidth is sufficiently large to deliver the
- view-limited compiled subgraph in a timely fashion, and
- the client system has graphics rendering support.

The client interface 435 may send view information updates to the server interface 415 whenever the view information changes (e.g., when the user's direction of gaze changes or when the user's virtual positions changes). The server interface 415 may use the view information updates to generate subgraph updates. The subgraph updates may include nodes that need to be added to the view-limited compiled subgraph and specifications of nodes that need to be removed from the view-limited compiled subgraph.

The server interface 415 may send the subgraph updates to the client system so that the client system may update its copy of the view-limited compiled subgraph.

If the client system C does not have a sufficiently large computational power to handle the view-limited compiled subgraph or the client's network connection bandwidth is not sufficiently large to deliver the view-limited compiled subgraph in a timely fashion, the server interface 415 may perform view-frustum culling and scene traversing on the view-limited compiled subgraph in order to obtain a state-sorted render graph. A specification of the view-frustum may be provided as part of the client description data 620. The server interface 415 may send the state-sorted render graph to the client through the network 150 if:
- the computational power of the client system is sufficiently large to handle the state-stored render graph,
- the client's network connection bandwidth is sufficiently large to deliver the state-stored render graph in a timely fashion, and
- the client system has graphics rendering support.

If the client system C does not have a sufficiently large computational power to handle the state-sorted render graph, or, the client's network connection bandwidth is not sufficiently large to deliver the state-stored render graph in a timely fashion, or, the client system does not have graphics rendering support, the server interface 415 may render the state-sorted render graph to generate images corresponding to the client's view information. The server interface 415 may send the images to the client.

Thus, in summary, the server interface 415 may send graphics data to the client C in various formats depending on the client's capabilities as expressed by the client description data. The formats include:

(1) an uncompiled subgraph $T_G(C)$;
(2) a compiled subgraph;
(3) a view-limited compiled subgraph;
(4) a state-sorted render graph; and
(5) rendered images.

High end workstations with excellent network connections typically will be able to handle format (1). Workstations with more modest network connections may be supplied with graphics data in format (2). Client systems with lower host computing power may be supplied with graphics data in format (3). Client systems with insufficient computing power to process even a view-limited compiled subgraph may be supplied with graphics data in format (4). The lowest end devices (e.g., mobile devices or hand-held devices) without graphics rendering support may be supplied with graphics data in format (5).

Note that the time required for a given client to generate a rendered image decreases from format (1) to format (5). If the user has declared a preference for "speed over quality", the server 100 may select the smallest integer k so that the client is guaranteed to be able to render the data in format (k) within the display frame time, and then send the data to the client using format (k). If the user preference is for "quality over speed", then the server interface 415 may send the data in format (j) instead, where j is the smallest integer so that the client is guaranteed to be able to render a frame within some maximum time the user deems to be tolerable. For example, for a CAD application, a user may be willing to wait for an image no more than 10 seconds. Because the display frame time is less then the maximum tolerable time, the integer k is greater than or equal to j.

The methodology described above simplifies the technical complications in providing 3D datasets across a distributed environment to heterogeneous clients ranging from mobile devices to powerful workstations.

In some embodiments, the server interface 415 and client interface 435 may be implemented as a modification to the Java 3D API.

Figure 7:
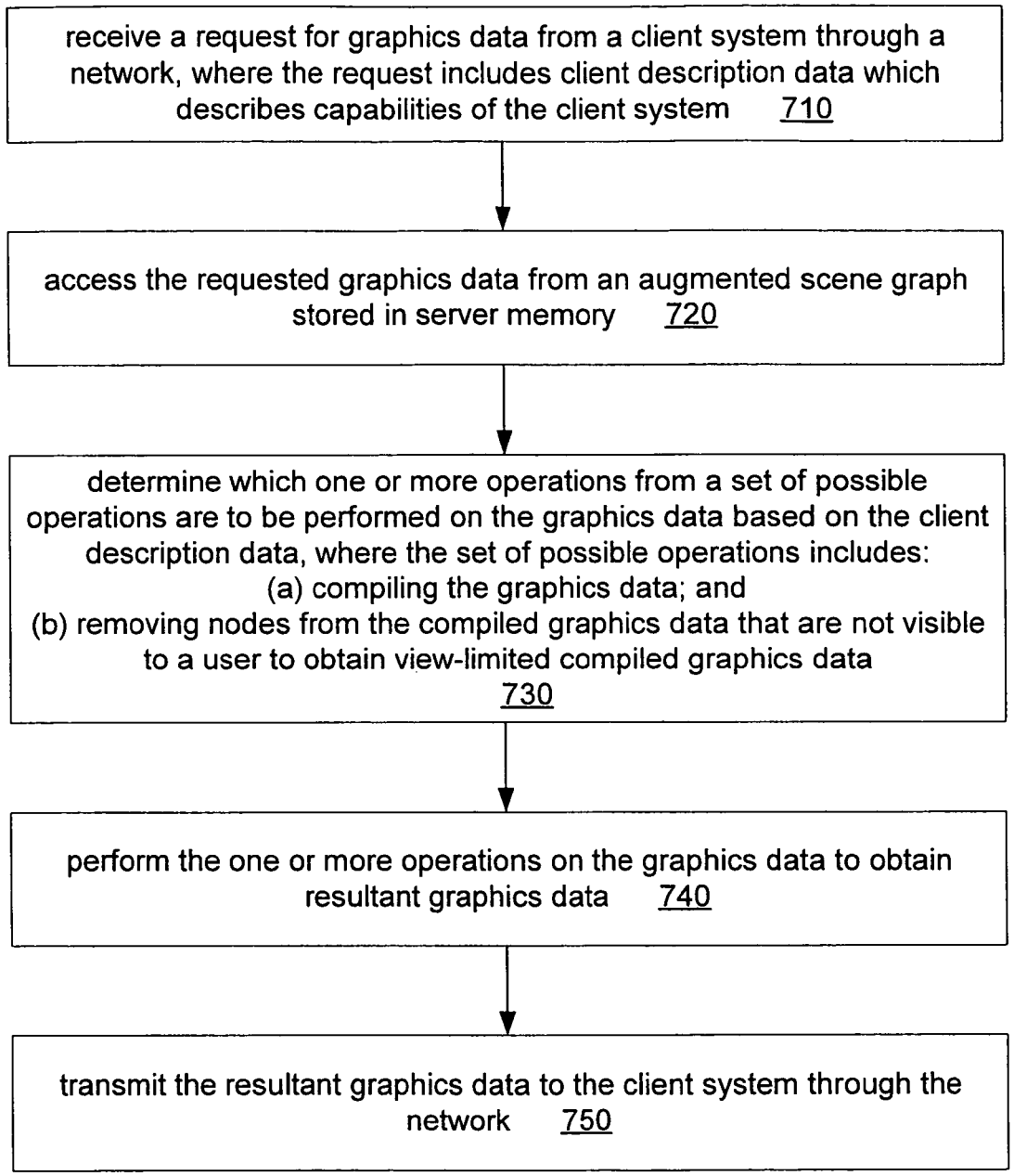
FIG. 7 illustrates one set of embodiments of a method for communicating graphics data through to client system through a network.

In one set of embodiments, a server may be configured to implement a method for communicating graphics data to clients through a network as shown in FIG. 7. The method may involve the following actions.

At 710, the server may receive a request for graphics data from a client system through a network. The request may include client description data which describes capabilities of the client system.

At 720, the server may access the requested graphics data from an augmented scene graph. The augmented scene graph may be stored in a system memory of the server.

At 730, the server may determine which one or more operations from a set of possible operations are to be performed on the graphics data based on the client description data. The set of possible operations may include:

(a) compiling the graphics data; and
(b) removing nodes from the compiled graphics data that are not visible to a user to obtain view-limited compiled graphics data.

At 740, the server may perform the one or more operations on the graphics data to obtain resultant graphics data.

At 740, the server may transmit the resultant graphics data to the client system through the network.

Figure 8:
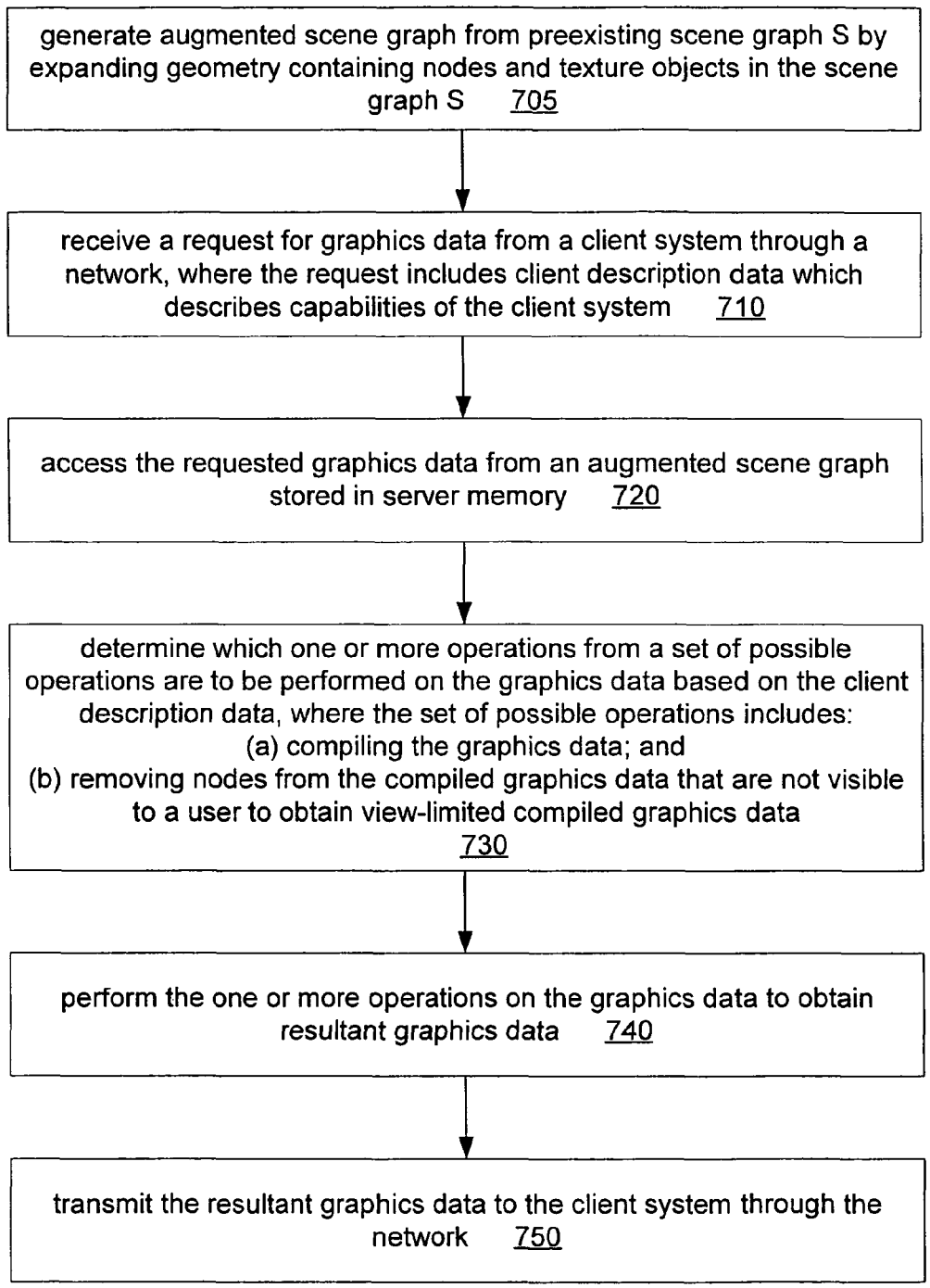
FIG. 8 illustrates the generation of the augmented scene graph from a preexisting scene graph prior to said receiving the graphics data request.

The server may generate the augmented scene graph by expanding a preexisting scene graph S, e.g., as illustrated in the embodiment of FIG. 8.

The process of expanding the scene graph S may include:
expanding one or more geometry-containing nodes (e.g., Shape3D nodes) in the scene graph S, e.g., as illustrated in FIG. 5; and
expanding one or more texture objects in the scene graph S.

Figure 9:
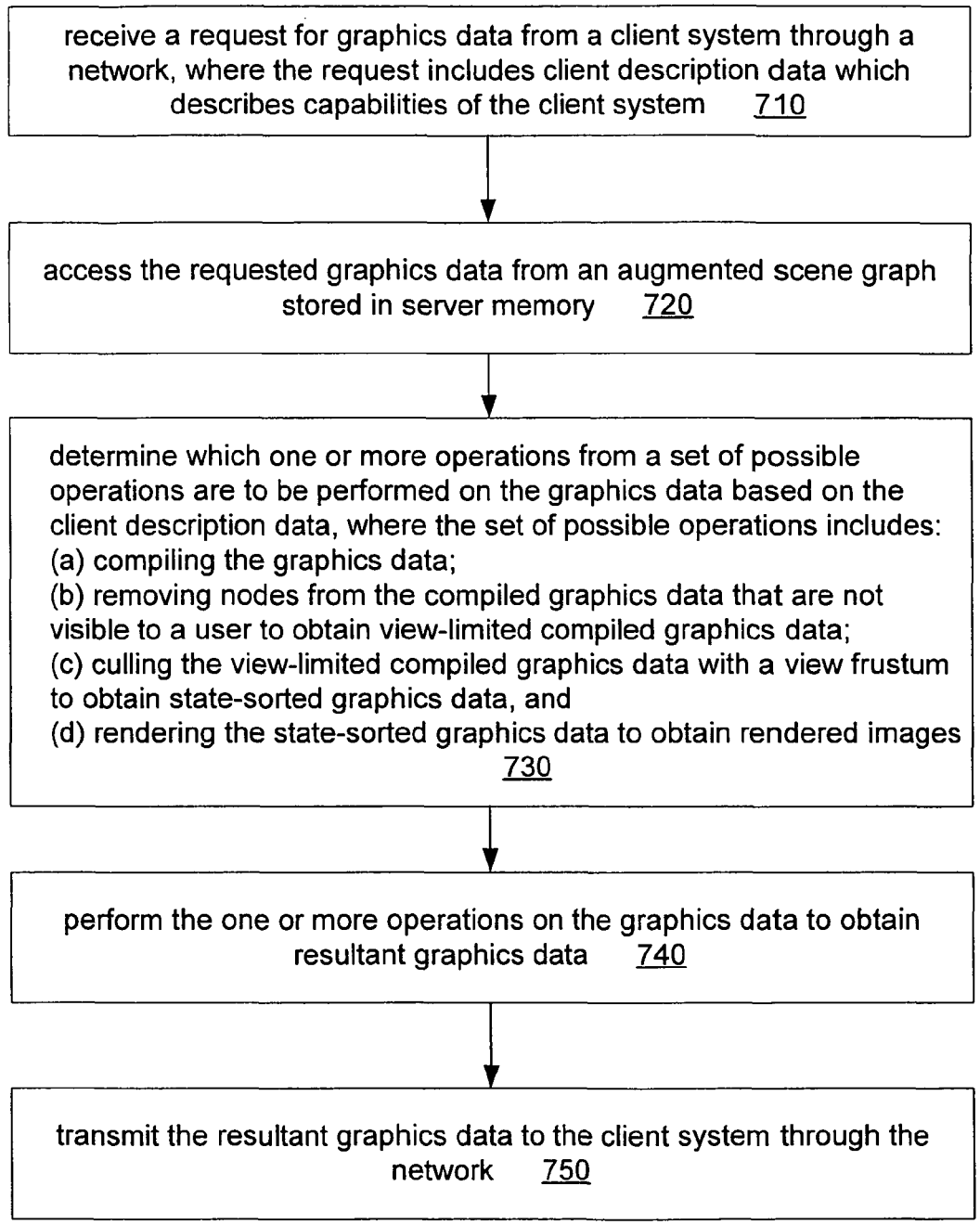
FIG. 9 illustrates that the set of possible operations on the graphics data may also include (c) culling the view-limited compiled subgraph and (d) rendering the state-sorted graphics data.

In some embodiments, the set of possible operations may further include:
(c) culling the view-limited compiled graphics data with a view frustum to obtain state-sorted graphics data, and
(d) rendering the state-sorted graphics data to obtain rendered images, as shown in FIG. 9.

In one set of embodiments, the processes of receiving (710), accessing (720), determining (730), performing (740) and transmitting (750) are implemented as part of a graphics application programming interface (API), e.g., as part of a scene-graph-based graphics API such as Java3D™.

The client description data may describe capabilities of the client system, e.g., capabilities including:
physical constraints of the client system; and
a network connection bandwidth of the client system.

See, e.g., FIG. 6. In addition, the client description data may describe client system capabilities such as:
preferences of a user of the client system regarding performance of a software application; and
view information.

The view information may include a direction of gaze and/or a virtual viewer position.

Figure 10:
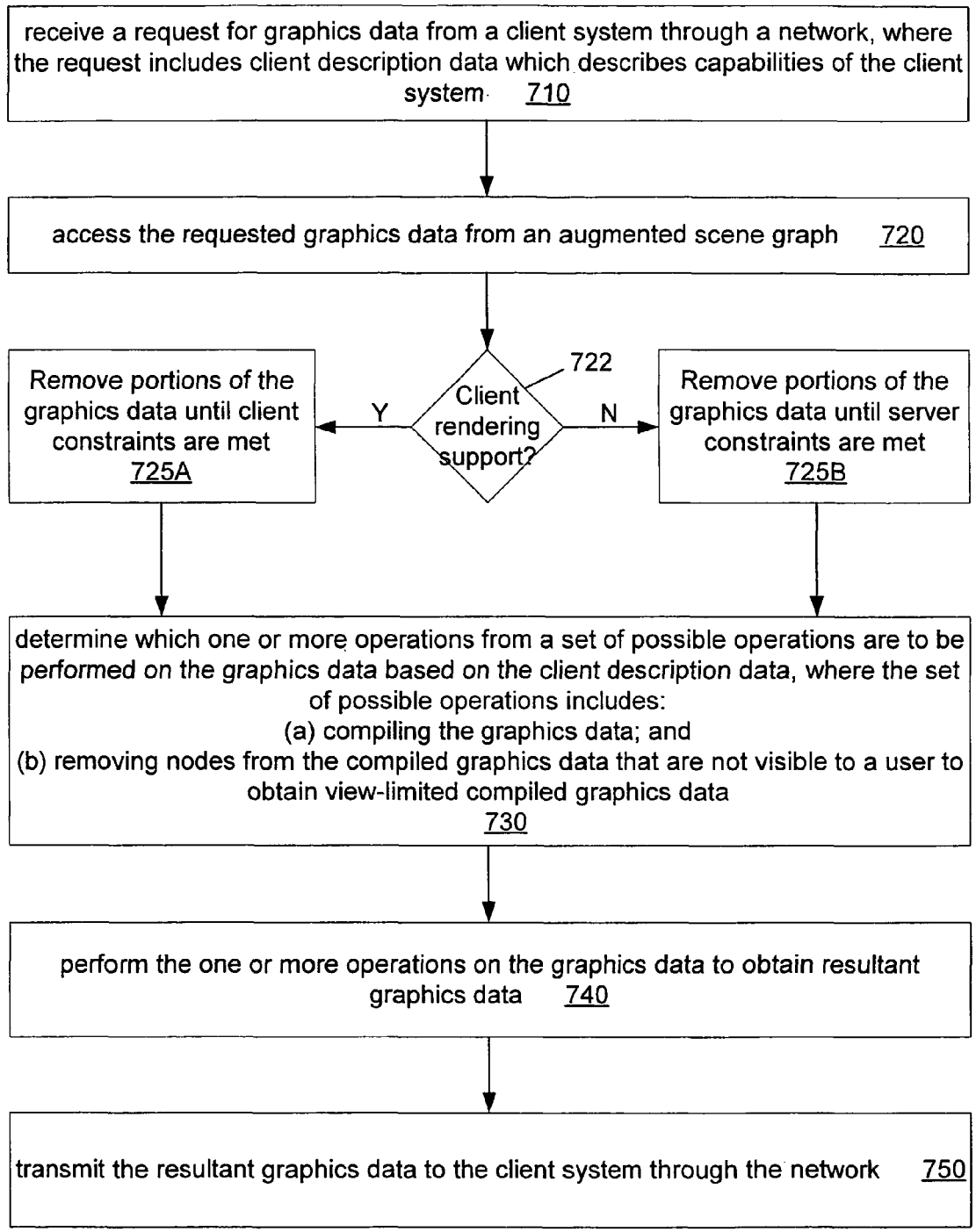
FIG. 10 illustrates that the portions of the accessed graphics data may be removed until client or server constraints are satisfied, depending on whether or not the client system includes graphics rendering support.

In some embodiments, the server may determine if the client has (software and/or hardware) graphics rendering support from rendering support information included in the client description data as indicated at 722 of FIG. 10. If the client has graphics rendering support, the server may remove portions of the graphics data until client constraints are met as indicated at 725A. If the client does not have graphics rendering support, the server may remove portions of the graphics data until server constraints are met as indicated at 725B.

In one embodiment, the graphics data request sent by the client system may specify a subgraph of the augmented scene graph. The process 720 of accessing the requested graphics data from the scene graph may include generating a copy of the subgraph (of the augmented scene graph) specified by the request. If the client system has graphics rendering support, the server may remove portions of data from said copy until:
a maximum triangle count of the copy is less than or equal to a triangle count of the client system;
a maximum texture size of the copy is less than or equal a texture memory capacity of the client system; and
a maximum memory footprint of the copy is less than or equal to an amount of system memory in the client system available for storage of said request graphics data.

The triangle count, the texture memory capacity and the system memory amount of the client system may be determined from the client description data.

Alternatively, if the client system does not have graphics rendering support, the server may remove portions of data from said copy until:

a maximum triangle count of the copy less than or equal to a maximum triangle count of a server; a maximum texture size of the copy is less than or equal to a texture memory capacity of the server; and a maximum memory footprint of the copy is less than or equal to an available memory amount of the server.

In some embodiments, the resultant graphics data may include level-of-detail nodes. (Level-of-detail nodes are well known to graphics programmers.) The process of transmitting the resultant graphics data may include transmitting Shape3D nodes under each level of detail node in order of lowest resolution to highest resolution. Thus, the client system may immediately being to display images corresponding to the lower resolution Shape3D, and then, successively refine.

Furthermore, the resultant graphics data may include texture hierarchies. Thus, the process of transmitting the resultant graphics data may also include transmitting layers in each texture hierarchy in order from lowest resolution to highest resolution.

The client system may render the resultant graphics to obtain images (unless the resultant graphics data already are images). The client system may display the images on a display device of the client system.

The one or more operations (performed on the graphics data) may include a larger number of operations if the client description data indicates a user preference for speed than if the client description data indicates a user preference for image quality. The larger number of operations may serve to reduce the size of the data to facilitate faster transmission through the network and/or faster processing and rendering at the client.

Figure 11:
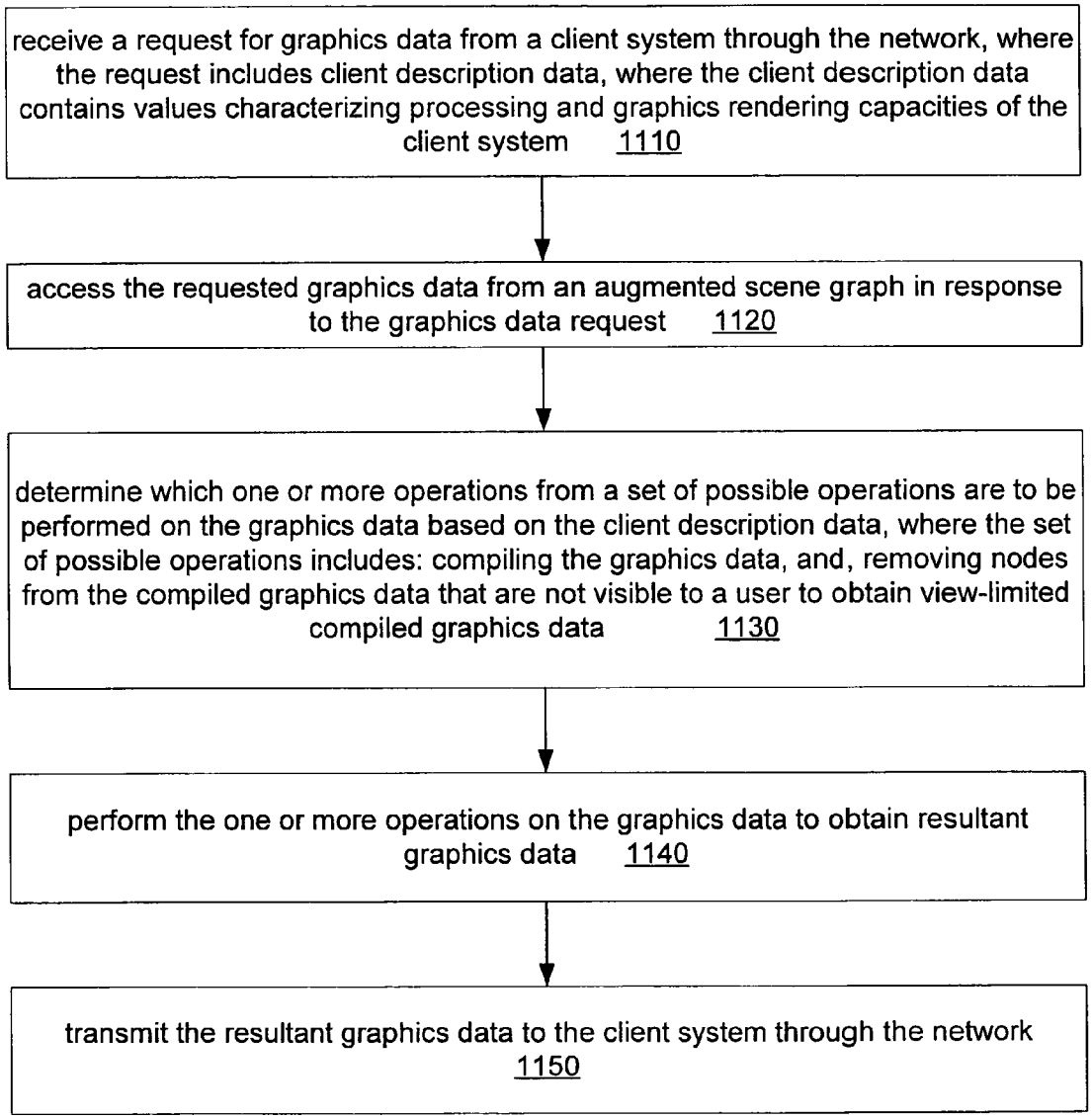
FIG. 11 illustrates that another set of embodiments of the method for communicating graphics data to client systems through a computer network.

In another set of embodiments, a server may implement a method for communicating graphics data to a plurality of clients through a network as illustrated in FIG. 11.

At 1110, the server may receive a request for graphics data from a client system through the network. The request may include client description data. The client description data may contain values characterizing processing and graphics rendering capacities of the client system, e.g., as variously described above.

At 1120, the server may access the requested graphics data from an augmented scene graph in response to the graphics data request.

At 1130, the server may determine which one or more operations from a set of possible operations are to be performed on the graphics data based on the client description data. The set of possible operations may include:

compiling the graphics data;

removing nodes from the compiled graphics data that are not visible to a user to obtain view-limited compiled graphics data.

At 1140, the server may perform the one or more operations on the graphics data to obtain resultant graphics data.

At 1150, the server may transmit the resultant graphics data through the network to the client system.

In some embodiments, the set of possible operations may further include culling the view-limited compiled graphics data with a view frustum to obtain state-sorted graphics data. The set of possible operations may yet further include rendering the state-sorted graphics data to obtain rendered images.

Figure 12:
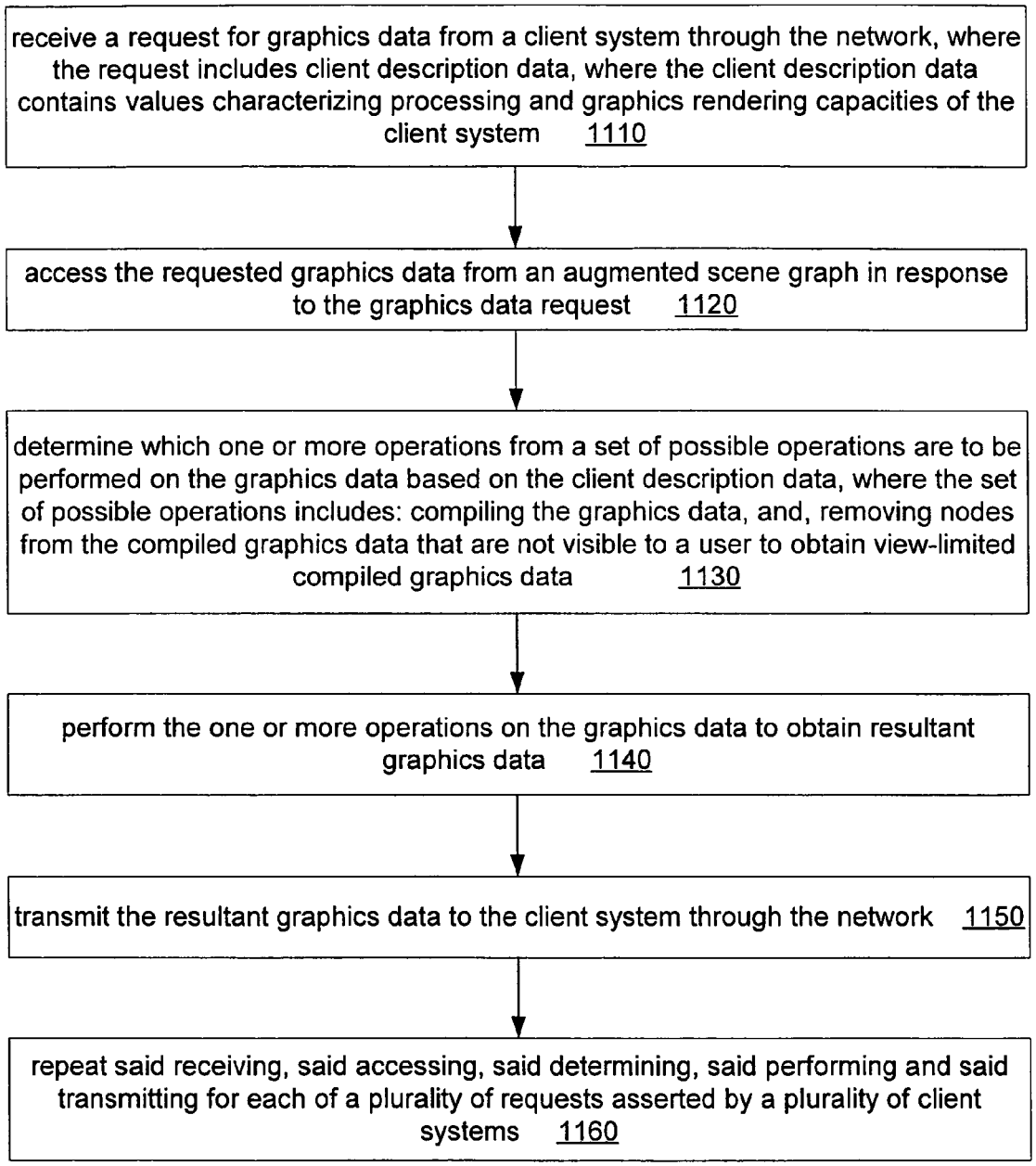
FIG. 12 illustrates that the processes of receiving, accessing, determining, performing and transmitting outlined in FIG. 11 may be repeated for a plurality of graphics data requests asserted by a plurality of client systems.

In one group of embodiments, the server may repeat the above described processes (of receiving, accessing, determining, performing and said transmitting) for each of a plurality of graphics data requests asserted by a plurality of client systems as illustrated at 1160 of FIG. 12. In one embodiment, the server may cache (i.e., save) a copy of the resultant graphics data which was generated in response to request from a first client, and then, serve portions of the resultant graphics data to other clients having similar constraints in response to requests from those other clients.

It is noted that any or all of the method embodiments described herein may be implemented in terms of program instructions and the program instructions may be stored on any of a wide variety of computer-readable memory media. Examples of memory media include:

semiconductor memories of various kinds (including semiconductor RAM and semiconductor ROM of various kinds), magnetic memories of various kinds (including magnetic disks of various kinds), and optical storage media of various kinds (including CD-ROM and DVD).

For example, the program instructions may be distributed to customers by storing the program instructions on memory media and selling (or otherwise distributing) copies of the memory media.

It is further noted that program instructions implementing any or all of the methods described herein may be transmitted through any of various transmission media or combinations thereof, and thereby, made available to server systems and client systems. Examples of transmission media include:

optical media such as optical fiber;

wired electrical links; and free space.

As used herein, the term "transmission medium" includes computer networks such as local area networks or wide area networks. For example, program instructions implementing one or more of the embodiments described herein may be distributed to servers and/or clients through a computer network such as the Internet.

It is further noted that program instructions implementing any or all of the method embodiments described herein may be stored in the memory of a computer system, e.g., a computer system such as that illustrated in FIG. 2 or in FIG. 3. A processor (of set of processors) of the computer system may be configured to read and execute the program instructions of the memory in order to enact the method embodiment(s).

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as a network and/or a wireless link.

The various methods as illustrated in the Figures and described herein represent exemplary embodiments of methods. The methods may be implemented in software, hardware, or a combination thereof. The order of method actions may be changed, and various actions may be added, reordered, combined, omitted, modified, etc.

Various modifications and changes may be made as would be obvious to a person skilled in the art having the benefit of this disclosure. It is intended that the invention embrace all such modifications and changes and, accordingly, the above description is to be regarded in an illustrative rather than a restrictive sense.

What is claimed is:

1. A non-transitory computer-readable storage medium comprising program instructions, wherein the program instructions, if executed by a computer system, cause the computer system to:
- receive a request for graphics data from a first client system via a network, wherein the request includes client description data that describes capabilities of the first client system including:
  - physical constraints of the first client system;
  - a type of graphics rendering supported by the first client system; and
  - a network connection bandwidth of the first client system, wherein the type of graphics rendering support indicates whether or not the first client system has graphics accelerator support for graphics rendering,
  - wherein the request also includes a current viewing position and a current viewing direction of a virtual viewer within a 3D virtual world, wherein the current viewing position and the current viewing direction correspond to a user of the first client system, wherein the computer system and the first client system are distinct computer systems configured to communicate through the network;
- access the graphics data from a first scene graph in response to receiving the request;
- operate on the accessed graphics data to obtain resultant graphics data, wherein said operating includes compiling the accessed graphics data to obtain compiled graphics data, wherein the compiled graphics data occupies less memory space than the accessed graphics data, wherein said operating includes performing a first additional operation in response to a determination by the computer system that the compiled graphics data is not within the capabilities of the first client system as indicated by the client description data, wherein the first additional operation includes removing nodes from the compiled graphics data that are not visible relative to the current viewing position and the current viewing direction to obtain view-limited compiled graphics data, wherein said removing nodes from the compiled graphics data comprises traversing the compiled graphics data according to a traversal order determined by an application executing on the computer system;
- transmit the resultant graphics data to the first client system;
- receive a view information update from the first client system via the network, wherein the view information update includes an update to the current viewing position and/or an update to the current viewing direction of the virtual viewer;
- in response to receiving the view information update, generate a subgraph update that includes nodes to be added to the view-limited compiled graphics data and specifications of nodes to be removed from the view-limited compiled graphics data; and
- send the subgraph update to the first client system via the network.

2. The storage medium of claim 1, wherein said operating includes performing a second additional operation in response to a determination by the computer system that the view-limited compiled graphics data is not within the capabilities of the first client system as indicated by the client description data, wherein the second additional operation includes culling the view-limited compiled graphics data with a view frustum to obtain state-sorted graphics data.

3. The storage medium of claim 2, wherein said operating includes performing a third additional operation in response to a determination by the computer system that the state-sorted graphics data is not within the capabilities of the first client system as indicated by the client description data, wherein the third additional operation includes rendering the state-sorted graphics data to obtain rendered images.

4. The storage medium of claim 1, wherein the capabilities described by the client description data also include:
- preferences of the user of the first client system regarding performance of a software application on the first client system.

5. The storage medium of claim 1, wherein the program instructions, if executed by the computer system, further cause the computer system to:
- receive a second request for second graphics data from the first client system, wherein the second request includes an updated viewing direction of the user of the first client system;
- access the second graphics data from the first scene graph in response to receiving the second request;
- compile the second graphics data to obtain second compiled graphics data;
- remove nodes from the second compiled graphics data that are not visible relative to the updated viewing direction to obtain second resultant data; and
- transmit the second resultant data to the first client system over the network.

6. The storage medium of claim 1, wherein said accessing the graphics data from the first scene graph includes generating a copy of a subgraph of the first scene graph, wherein the subgraph is specified by the request, wherein the program instructions, if executed by the computer system, further cause the computer system to remove portions of data from said copy until:
- a maximum triangle count of the copy is less than or equal to a triangle count of the first client system;
- a maximum texture size of the copy is less than or equal to a texture memory capacity of the first client system; and
- a maximum memory footprint of the copy is less than or equal to an amount of system memory in the first client system available for storage of said graphics data;
- wherein the triangle count, the texture memory capacity and the system memory amount of the first client system are determined by the client description data.

7. The storage medium of claim 1, wherein said accessing the graphics data from the first scene graph includes generating a copy of a subgraph of the first scene graph, wherein the subgraph is specified by the request, wherein the program instructions, if executed by the computer system, further cause the computer system to remove portions of data from said copy until:
- a maximum triangle count of the copy less than or equal to a maximum triangle count of the computer system;
- a maximum texture size of the copy is less than or equal to a texture memory capacity of the computer system; and
- a maximum memory footprint of the copy is less than or equal to an available memory amount of the computer system.

8. The storage medium of claim 1, wherein the resultant graphics data includes a plurality of level of detail nodes, wherein each of the level of detail nodes includes a plurality of Shape3D nodes, wherein said transmitting the resultant graphics data includes transmitting the plurality of Shape3D nodes under each level of detail node in order of lowest resolution to highest resolution.

9. The storage medium of claim 1, wherein the resultant graphics data includes a plurality of texture hierarchies, wherein each of the texture hierarchies includes a plurality of layers, wherein said transmitting the resultant graphics data includes transmitting the plurality of layers in each texture hierarchy in order from lowest resolution to highest resolution.

10. The storage medium of claim 1, wherein the program instructions, if executed by the computer system, cause the computer system to:
  receive a second request for second graphics data from a second client system, wherein the second request includes second client description data that describes capabilities of the second client system;
  access the second graphics data from the first scene graph in response to receiving the second request;
  compile the accessed second graphics data to obtain second compiled graphics data;
  transmit the second compiled graphics data to the second client system in response to a determination that the second compiled graphics data is within the capabilities of the second client system as indicated by the second client description data, wherein the second compiled graphics data has not been subjected to view frustum culling.

11. The storage medium of claim 1, wherein the resultant graphics data has a data size and format that are within the capabilities of the first client system as described by the client description data.

12. The storage medium of claim 1, wherein the request from the first client system includes information identifying a group node in the first scene graph, wherein the accessed graphics data corresponds to the group node.

13. The storage medium of claim 1, wherein the program instructions, if executed by the computer system, cause the computer system to:
  receive a second request for second graphics data from a second client system, wherein the second request includes second client description data that describes capabilities of the second client system;
  access the second graphics data from the first scene graph in response to receiving the second request;
  transmit the second graphics data to the second client system in response to a determination by the computer system that the second graphics data is within the capabilities of the second client system as indicated by the second client description data, wherein the second graphics data is neither compiled nor state sorted.

14. A method comprising:
  (a) receiving by a computer system a request for graphics data from a client system through a network, wherein the request includes client description data, wherein the client description data contains values characterizing processing and graphics rendering capacities of the client system, wherein the request also includes a current viewing position and a current viewing direction of a virtual viewer within a 3D virtual world, wherein the current viewing position and the current viewing direction correspond to a user of the client system, wherein the client description data describes capabilities of the client system including: physical constraints of the client system; a type of graphics rendering supported by the client system; and a network connection bandwidth of the client system, wherein the type of graphics rendering support indicates whether or not the client system has graphics accelerator support for graphics rendering;
  (b) accessing by the computer system the graphics data from a scene graph in response to receiving the request;
  (c) operating by the computer system on the accessed graphics data to obtain resultant graphics data, wherein said operating includes compiling the accessed graphics data to obtain compiled graphics data, wherein the compiled graphics data occupies less memory space than the accessed graphics data, wherein said operating includes performing a first additional operation in response to a determination that the compiled graphics data is not within the processing and graphics rendering capacities of the client system as indicated by the client description data, wherein the first additional operation includes removing nodes from the compiled graphics data that are not visible relative to the current viewing position and the current viewing direction to obtain view-limited compiled graphics data, wherein said removing nodes from the compiled graphics data comprises traversing the compiled graphics data according to a traversal order determined by an application executing on the computer system;
  (d) transmitting by the computer system the resultant graphics data through the network to the client system;
  (e) receiving by the computer system a view information update from the client system through the network, wherein the view information update includes an update to the current viewing position and/or an update to the current viewing direction of the virtual viewer;
  (f) in response to receiving the view information update, generating by the computer system a subgraph update that includes nodes to be added to the view-limited compiled graphics data and specifications of nodes to be removed from the view-limited compiled graphics data; and
  (g) sending by the computer system the subgraph update to the client system through the network.

15. The method of claim 14, wherein said operating includes performing a second additional operation by the computer system in response to a determination that the view-limited compiled graphics data is not within the capabilities of the client system as indicated by the client description data, wherein the second additional operation includes:
  culling the view-limited compiled graphics data with a view frustum corresponding to the client system to obtain state-sorted graphics data; and
  rendering the state-sorted graphics data to obtain rendered images.

16. The method of claim 14 further comprising:
  repeating (a), (b), (c) and (d) for each of a plurality of requests asserted by a plurality of client systems, wherein the resultant graphics data transmitted to a first of the plurality of client systems includes rendered images, wherein the resultant data transmitted to a second of the plurality of client systems does not include rendered images, wherein the resultant data transmitted to a third of the plurality of client systems is compiled but not state sorted.

17. The method of claim 14, wherein the request from the client system includes information identifying a group node in the scene graph, wherein the accessed graphics data corresponds to the group node.

18. A system comprising:

a memory medium storing program instructions; and a processor configured to read and execute the program instructions from the memory medium, wherein the program instructions, if executed by the processor, cause the processor to:

receive a request for graphics data from a client system over a network, wherein the request includes client description data that describes capabilities of the client system, wherein the request also includes a current viewing position and a current viewing direction of a virtual viewer within a 3D virtual world, wherein the current viewing position and the current viewing direction correspond to a user of the client system, wherein the client description data describes capabilities of the client system including: physical constraints of the client system; a type of graphics rendering supported by the client system; and a network connection bandwidth of the client system, wherein the type of graphics rendering support indicates whether or not the client system has graphics accelerator support for graphics rendering;

access the graphics data from a first scene graph in response to receiving the request;

operate on the accessed graphics data to obtain resultant graphics data, wherein said operating includes compiling the accessed graphics data, wherein the compiled graphics data occupies less memory space than the accessed graphics data, wherein said operating includes performing a first additional operation in response to a determination that the compiled graphics data is not within the capabilities of the client system as indicated by the client description data, wherein the first additional operation includes removing nodes from the compiled graphics data that are not visible relative to the current viewing position and the current viewing direction to obtain view-limited compiled graphics data, wherein said removing nodes from the compiled graphics data comprises traversing the compiled graphics data according to a traversal order determined by an application executing on the computer system; and transmit the resultant graphics data to the client system;

receive a view information update from the client system over the network, wherein the view information update includes an update to the current viewing position and/or an update to the current viewing direction of the virtual viewer;

in response to receiving the view information update, generate a subgraph update that includes nodes to be added to the view-limited compiled graphics data and specifications of nodes to be removed from the view-limited compiled graphics data; and send the subgraph update to the client system over the network.

19. The system of claim 18, wherein the request from the client system includes information identifying a group node in the scene graph, wherein the accessed graphics data corresponds to the group node.

* * * * *